United States Patent Office 3,309,397
Patented Mar. 14, 1967

3,309,397
PRODUCTION OF PENTAERYTHRITOL
TRINITRATE
Henry Martin Brennecke, Woodstown, and Donald Nixon
Thatcher, Pitman, N.J., assignors to E. I. du Pont de
Nemours and Company, Wilmington, Del., a corporation of Delaware
No Drawing. Filed June 9, 1959, Ser. No. 818,965
6 Claims. (Cl. 260—467)

The present invention relates to a process for the preparation of an explosive compound useful as a propellent intermediate. More particularly, the present invention relates to the preparation of pentaerythritol trinitrate.

Several processes are disclosed in the literature for the preparation of pentaerythritol trinitrate. In one method of preparation, pentaerythritol monoacetate is first prepared and this product is then esterified by concentrated nitric acid to obtain pentaerythritol monoacetate trinitrate which is then converted to the trinitrate by controlled saponification. In more recent methods of preparation, pentaerythritol is directly esterified by means of nitric acid alone or mixed with sulfuric or phosphoric acids. These processes disclosed in the literature have the disadvantages of producing considerable amounts of pentaerythritol tetranitrate along with the trinitrate. Not only is the yield of pentaerythritol trinitrate reduced by the formation of the tetranitrate, but also the accumulation of the insoluble tetranitrate presents safety hazards. Moreover, the prior art process generally require stringent temperature controls in order to avoid a "fume-off" and possible explosion.

A safe and economical process for the preparation of pentaerythritol trinitrate is needed.

Accordingly, it is an object of the present invention to provide an improved process for the synthesis of pentaerythritol trinitrate in high yields. Another object is to provide a process for the synthesis of pentaerythritol trinitrate whereby minimum amounts of the tetranitrate and dinitrate are produced. A still further object is to provide an economical process in which hazardous conditions are substantially avoided and greater safety is provided. Other and additional objects will become apparent as the invention is further described.

We have found that the foregoing objects are achieved by dissolving pentaerythritol in aqueous sulfuric acid, adding methylene chloride, and then adding nitric acid or a mixture of nitric and sulfuric acids. In accordance with the process of the present invention, pentaerythritol trinitrate is prepared by dissolving pentaerythritol in aqueous sulfuric acid having a concentration in the range of from about 60 to about 75% by weight, mixing methylene chloride with the solution formed, and thereafter adding to the mixture sufficient nitric acid to provide from five to nine moles of nitric acid per mole of pentaerythritol and sufficient sulfuric acid to provide from 1.5 to 3 parts by weight of sulfuric acid per part of total water (including water formed in the esterification of the pentaerythritol by the nitric acid), agitating the mixture while allowing the reaction to proceeed at about −5 to about +40° C., allowing the mixture to stratify, separating the layers thus produced, and thereafter recovering the pentaerythritol trinitrate from the methylene chloride which is present in an amount equal to at least 60% by weight of the total reaction medium.

The following examples, in which the parts are by weight, illustrate the process of the invention and are not to be construed as limiting the invention in any manner. The pentaerythritol used in the examples contained a minimum of 98% pentaerythritol and a maximum of 2% dipentaerythritol.

The following run demonstrates preferred operating conditions for the process.

*Example 1*

Pentaerythritol (80) parts was dissolved at 5° C. in approximately 64% sulfuric acid (182 parts of 98% sulfuric acid in 96 parts of water). After dissolution of the pentaerythritol, methylene chloride in the amount of about 3206 parts was added to the solution and intimately mixed therewith by vigorous agitation. A mixed acid of 72 parts of 98% sulfuric acid and 272 parts of 96% nitric acid was then added rapidly to the vigorously stirred mixture (approximately 7 moles of nitric acid were provided for each mole of pentaerythritol). The agitated reaction mixture was warmed to 20° C. and held at this temperature for a period of 15 minutes. At the end of this period, the methylene chloride phase was separated from the acid phase, and the residual acid in the methylene chloride phase was neutralized with 10% sodium bicarbonate solution. The methylene chloride was flashed from the organic phase in a falling-film evaporator and ethyl ether was added to the residue to precipitate the pentaerythritol tetranitrate which was then filtered off, leaving crude pentaerythritol trinitrate. The amount of crude pentaerythritol trinitrate recovered was 130 parts and of the tetranitrate, 16.6 parts. Analysis of the crude trinitrate recovered showed that the conversions based on pentaerythritol were: trinitriate, 76.4%; tetranitrate, 9.8%; and dinitrate, 4.1%.

The following run demonstrates the use of a lower molar ratio of nitric acid to pentaerythritol.

*Example 2*

Pentaerythritol (80 parts) was dissolved at 5° C. in approximately 68% sulfuric acid (322 parts of 98% sulfuric acid in 152 parts of water). After dissolution of the pentaerythritol, methylene chloride in the amount of about 4115 parts was added to the solution. A mixed acid of 72 parts of 98% sulfuric acid and 232 parts of 96% nitric acid (approximately 6 moles of nitric acid per mole of pentaerythritol) was then added to the stirred mixture during a period of about 15 minutes. The reaction mixture was maintained at 5° C. for a period of 75 minutes. At the end of this period, the reaction mixture was worked up as described in Example 1. The amount of crude pentaerythritol trinitrate recovered was 129.2 parts; no tetranitrate was precipitated. Analysis of this crude showed that the conversions based on pentaerythritol were: trinitrate, 69.4%; tetranitrate, 6.4%; and dinitrate, 2.2%.

The following run demonstrates the use of a higher molar ratio of nitric acid to pentaerythritol.

*Example 3*

The procedure of Example 2 was followed and the quantities of components were:

Pot components:
| | Parts |
|---|---|
| Pentaerythritol | 80 |
| 98% sulfuric acid | 142 |
| Water | 80 |
| Methylene chloride | 4115 |

Feed components:
| | |
|---|---|
| 98% sulfuric acid | 72 |
| 96% nitric acid | 312 |

Approximately 8 moles of nitric acid were provided for each mole of pentaerythritol. The amount of crude pentaerythritol trinitrate recovered was 118.6 parts and the amount of tetranitrate was 26.9 parts. The conversions based on pentaerythritol were: trinitrate, 69.0%; tetranitrate, 16.3%; and dinitrate, 2.3%.

The following run demonstrates that a high initial concentration of aqueous sulfuric acid may be used and that the process is operable at low temperatures.

*Example 4*

The procedure of Example 2 was followed except that the reaction temperature was −5° C. The quantities of components were:

Pot components: Parts
    Pentaerythritol _____ 80
    98% sulfuric acid _____ 302
    Water _____ 120
    Methylene chloride _____ 4115

Feed components:
    98% sulfuric acid _____ 72
    96% nitric acid _____ 272

The amount of crude pentaerythritol trinitrate recovered was 96 parts and the amount of tetranitrate was 46.2 parts. The conversions based on pentaerythritol were: trinitrate, 55.4%; tetranitrate, 26.9%; and dinitrate, 0.6%.

The following run illustrates that temperatures at the refluxing temperature of methylene chloride are operable.

*Example 5*

The procedure of Example 1 was followed except that the reaction temperature was 40° C. and the reaction time was 30 minutes. The quantities of components were:

Pot components: Parts
    Pentaerythritol _____ 80
    98% sulfuric acid _____ 182
    Water _____ 96
    Methylene chloride _____ 2405

Feed components:
    98% sulfuric acid _____ 72
    96% nitric acid _____ 272

The amount of crude pentaerythritol trinitrate recovered was 115.1 parts and the amount of the tetranitrate was 29.0 parts. The conversions based on pentaerythritol were: trinitrate, 66.9%; tetranitrate, 17.0%; and dinitrate, 4.4%.

In the foregoing examples the conversions reported to trinitrate and dinitrate were based on the quantities of these components obtained in the methylene chloride phase; however, all of the pentaerythritol trinitrate and dinitrate formed are not contained in the organic liquid phase. However, this is not deleterious as is shown by the following example, which illustrates a preferred procedure for the manufacture of the trinitrate.

*Example 6*

The order of addition of the following components, the reaction temperature, and reaction time were the same as those described in Example 2.

Pot components: Parts
    Pentaerythritol _____ 80
    98% sulfuric acid _____ 262
    Water _____ 124
    Methylene chloride _____ 4115

Feed components:
    98% sulfuric acid _____ 72
    96% nitric acid _____ 272

At the end of the reaction period, the methylene chloride phase was separated from the acid phase. The methylene chloride phase was worked up by (1) neutralizing residual acid with 10% sodium bicarbonate solution, (2) separating the wash solution, (3) flashing off the methylene chloride in a falling-film evaporator and (4) recovering it for reuse. Ethyl ether was added to the residue to precipitate the tetranitrate which was then filtered off. The amount of crude pentaerythritol trinitrate obtained was 124.7 parts (78.2% conversion) and of the tetranitrate, 17.3 parts (9.3% conversion). The acid phase again was washed with 4115 parts of methylene chloride. This second methylene chloride extract was mixed with a fresh acid-pentaerythritol charge. A run under identical conditions as the first was then made, including the work up of the methylene chloride phase. The amount of crude pentaerythritol trinitrate recovered this time was 144.1 parts and of the tetranitrate, 22.3 parts. Thus, in the two runs, a total of 268.8 parts of the trinitrate was obtained from 160 parts of pentaerythritol, providing a total conversion of 83.3% to the trinitrate. By repeating the procedure described, i.e., the washing of the acid phase, to extract essentially all of the pentaerythritol derivatives and return them to the reaction, further increase in the percentage conversion to the trinitrate can be obtained. Thus, in a plant operation, essentially all of the pentaerythritol is converted to either the trinitrate or tetranitrate ester, the quantity of the latter being held to a minimum by control of the operating conditions in accordance with this invention. In addition to recovering esters of pentaerythritol from the acid phase by the methylene chloride extraction, most of the unconsumed nitric acid is also recovered by the same extraction inasmuch as nitric acid is quite soluble in methylene chloride. The acid phase thus contains only minor quantities of organic material and of nitric acid, so that concentration of the sulfuric acid is greatly facilitated.

As can be seen from the examples, pentaerythritol trinitrate is obtained in high conversion in short reaction times by controlled direct esterification of pentaerythritol.

A critical feature of the exemplified process is the ratio of sulfuric acid to water. Sufficient sulfuric acid must be added to provide from about 1.5 to about 3 parts, by weight, of sulfuric acid for each part of total water, including water formed during the esterification of pentaerythritol by the nitric acid. When more than 3 parts of sulfuric acid are provided for each part of water, the amount of pentaerythritol trinitrate produced decreases. It has been found that in strong sulfuric acid solutions, pentaerythritol trinitrate disproportionates to the tetranitrate and dinitrate, until finally all of the trinitrate is disproportionated. When less than 1.5 parts of sulfuric acid are provided for each part of water, the primary reaction will be an oxidation, accompanied by explosive fume-offs.

Also critical in the process of the invention is the molar ratio of nitric acid to pentaerythritol. Between about five and about nine moles of nitric acid must be provided for each mole of pentaerythritol. When more than nine moles of nitric acid are provided for each mole of pentaerythritol, conversions to the trinitrate are lowered while conversions to the tetranitrate increase. When less than five moles of nitric acid are provided for each mole of pentaerythritol, again the conversions to the trinitrate decrease because of incomplete reactions. The effect of the nitric acid is apparently independent of the amount of sulfuric acid present.

To maintain the acid ratios in the range desired, a convenient and preferred method is to dissolve pentaerythritol in aqueous sulfuric acid having a concentration in the range of from about 60 to about 75% by weight. After the methylene chloride is added to the solution formed and the solution intimately mixed, additional nitric acid having a concentration of about 96% and sulfuric acid having a concentration of about 98% is then added to meet the desired ratios. By maintaining the initial sulfuric acid concentration between about 60 and 75%, readily available concentrated nitric and sulfuric acids may be conveniently used as the feed acids; however, nitric acid having a concentration of approximately from 68 to 70% is equally suitable. The use of a less concentrated acid requires, however, increased amounts of sulfuric acid to maintain the necessary ratios. When nitric acid having a concentration of 96% is used, the volume of the acid phase is at a minimum and therefore less methylene chloride is required in the extraction. Although the preferred method has been described to maintain the desired ratios, any combination of acids having various concentrations are equally applicable in the process of the invention, so long as the necessary ratios of sulfuric acid to water and of nitric acid to pentaerythritol are maintained.

The presence of an inert, sulfuric acid-immiscible organic solvent which dissolves the pentaerythritol trinitrate and, optionally, the tetranitrate, as it is being formed is necessary in the process of the invention. By removing the trinitrate from the acid phase of the reaction mixture, further reaction of the trinitrate to the tetranitrate is thus precluded. Sufficient solvent must be present to dissolve all the trinitrate produced, and usually the solvent is present in an amount equal to at least 60%, by weight, of the reaction medium. When less than the specified amount is provided, the amount of the trinitrate recovered is decreased. There is no upper limitation to the amount of solvent which may be present, except that an excessive amount of solvent is economically disadvantageous. Methylene chloride is the preferred solvent although other inert, immiscible organic solvents, such as chloroform and ethylene dichloride, may also be used. An advantage in the use of methylene chloride is that, under the exemplified process, the tetranitrate in concentrations produced in this process is solubilized along with the trinitrate and thus the danger of explosive tetranitrate slurries or emulsions forming in the reactor is eliminated.

The temperature at which the reaction is effected may range from about $-5°$ C. to about the reflux temperature of methylene chloride which is about $+40°$ C. Below about $-5°$ C., the reaction is so slow that only two hydroxyl groups are esterified. Above about $40°$ C., the solvent is removed. The preferred reaction temperature generally is between about $+5$ and $+25°$ C.

The time of reaction is dependent on the temperature employed. The reaction time may vary over a wide range, i.e., from about 5 minutes to about 2 hours, and preferably is about 15 minutes at about $20°$ C.

Several methods may be used to recover the pentaerythritol trinitrate. For example, the liquid organic and acid phases may be separated immediately as shown in the example, or the entire reaction mixture may be diluted with a sufficient amount of water to cause phase inversion, i.e., the methylene chloride becomes the more dense phase, and the organic layer is then separated. More pentaerythritol trinitrate is recovered by the drowning technique because of the decreased solubility of the pentaerythritol trinitrate in the dilute acid phase. Also, when the drowning technique is used, the amount of nitric acid extracted by the methylene chloride is lowered and therefore less neutralization solution is required. However, a disadvantage of the drowning technique is the difficulty of recovering the dilute waste acid for reuse.

In a preferred embodiment of the invention, the acid phase is extracted twice with equal portions of methylene chloride. As shown in Example 6, higher conversions to the trinitrate are obtained and residual organic material is removed from the acid phase by recycling the second extract with a fresh acid-pentaerythritol charge for the next run. The waste acid is essentially free of organic material and has a reduced nitric acid content.

Any conventional methods may be employed for separating the pentaerythritol tetranitrate from the trinitrate, for example, the tetranitrate may be precipitated out by cooling the mixture or by adding organic liquids, such as lower alkanols, for example, methyl or ethyl alcohol, or ethers, for example, ethyl ether.

The present invention has been described in detail in the foregoing. However, it will be apparent that many variations may be introduced without departure from the scope of the invention. We intend, therefore, to be limited only by the following claims.

We claim:

1. A process for preparing pentaerythritol trinitrate which comprises dissolving pentaerythritol in aqueous sulfuric acid having a concentration in the range of from 60% to 75% by weight, mixing therewith methylene chloride, reacting the mixture thus formed with sufficient nitric acid to provide from five to nine moles of nitric acid per mole of pentaerythritol and sufficient sulfuric acid to provide from 1.5 to 3 parts by weight of sulfuric acid per part of total water present in the reaction medium thus formed, including water formed in the esterification of the pentaerythritol by the nitric acid, the methylene chloride being present in an amount equal to at least 60% by weight of the total reaction medium, the temperature of said reaction medium being maintained between $-5°$ C. and $+40°$ C., and thereafter separating the organic liquid phase from the remainder of the reaction medium and recovering pentaerythritol trinitrate from said organic liquid phase.

2. A process as claimed in claim 1, wherein between about six and seven moles of nitric acid are provided per mole of said pentaerythritol.

3. A process as claimed in claim 1, wherein between about 2.0 and about 2.5 parts of sulfuric acid, by weight, are provided per part of said total water present in the reaction medium thus formed, including water formed in the esterification of the pentaerythritol by the nitric acid.

4. A process as claimed in claim 1, wherein the said methylene chloride is present in an amount equal to between about 75% and about 90% by weight of the said total reaction medium.

5. A process as claimed in claim 1, wherein the temperature of said reaction medium is between about 5 and about $25°$ C.

6. A process as claimed in claim 1 wherein the said remainder of the reaction mixture is washed with methylene chloride and at least a portion of said methylene chloride is used in a subsequent esterification of pentaerythritol by nitric acid.

References Cited by the Examiner

UNITED STATES PATENTS

| | | | |
|---|---|---|---|
| 1,660,651 | 2/1928 | Marshall et al. | 260—467 |
| 1,691,954 | 11/1928 | Bergeim | 260—467 |
| 1,933,754 | 11/1933 | Paterson | 260—467 |

OTHER REFERENCES

Boschan et al.: Chem. Reviews, vol. 55, pp. 487–8 (1955).

Camp et al.: J. Am. Chem. Soc., vol. 77, pp. 751 to 752 (1955).

CARL D. QUARFORTH, *Primary Examiner.*

LEON D. ROSDOL, ROGER L. CAMPBELL, BENJAMIN R. PADGETT, *Examiners.*

W. I. ANDRESS, J. W. WHISLER, L. A. SEBASTIAN, *Assistant Examiners.*